United States Patent
Lewis

[15] 3,686,713
[45] Aug. 29, 1972

[54] METHOD AND APPARATUS FOR KILLING FOWL

[72] Inventor: Ernest E. Lewis, Flowery Branch, Ga. 30542

[73] Assignee: Gainesville Machine Company, Inc., Gainesville, Ga.

[22] Filed: Sept. 29, 1970

[21] Appl. No.: 76,528

[52] U.S. Cl............................................17/52, 17/11
[51] Int. Cl................................................A22c 21/00
[58] Field of Search........................17/11, 12, 45, 52

[56] References Cited

UNITED STATES PATENTS

| | | | |
|---|---|---|---|
| 3,477,092 | 11/1969 | Simmons | 17/11 |
| 3,571,845 | 3/1971 | Martin et al. | 17/11 |

*Primary Examiner*—Lucie H. Laudenslager
*Attorney*—Newton, Hopkins & Ormsby

[57] ABSTRACT

A method and apparatus for killing fowl by passing a cutting member through the head of the fowl from ear to ear, whereby both the internal and external jugular veins are severed on each side. A suitable fowl slaughtering device comprises an air powered piston in a cylinder having a lateral externally mounted rigid connecting member attached to a stripper plate and an anvil member. A rigid piston rod slidably extends through a hole in the cylinder head, and a cutting member is detachedly secured to the end of the piston rod. The cutting member includes a hole proximately located in the side thereof and has a sharpened distal end which is slidably mounted in the stripper plate. In operation, the head of the fowl to be slaughtered is held between the stripper plate and anvil, and the ears lined up with the cutting member. Actuating the piston forces the cutting member through the head from ear to ear, severing both jugular veins at each side, thereby causing profuse bleeding and rapid death. Tissue which is lodged in the cutting member from the prior slaughter is forced out through a hole on the side thereof as the cutting member strikes the anvil, thereby avoiding the need for cleaning after each use.

5 Claims, 3 Drawing Figures

PATENTED AUG 29 1972  3,686,713
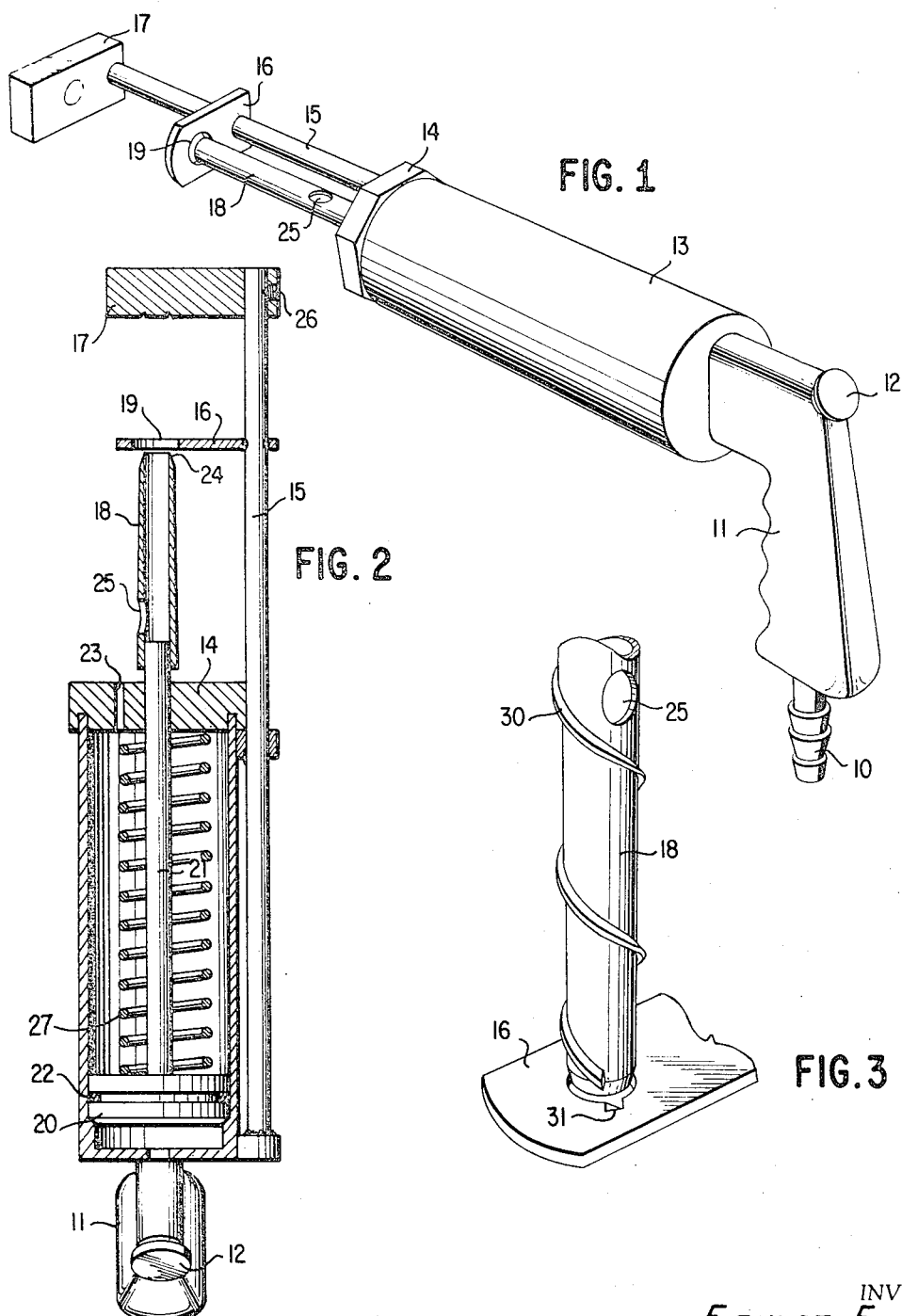
INVENTOR.
ERNEST E. LEWIS
BY
Newton, Hopkins, & Ormsby
ATTORNEYS

METHOD AND APPARATUS FOR KILLING FOWL

BACKGROUND OF THE INVENTION

1. Field Of The Invention

This invention relates to a method and apparatus for slaughtering fowl and more particularly to a method and apparatus for slaughtering chickens in which both jugular veins in the head are severed to cause rapid bleeding, while removing accumulated tissue debris with each use.

2. Description Of The Prior Art

Fowl slaughtering techniques have undergone great changes in recent years and, with some fowl such as chickens, have been refined to the point where very little human handling is required from the time they are delivered to the slaughter house until the time the cut and packaged product is distributed for sale.

Poultry raising is now a multi-billion dollar industry in this country alone, with an estimated 2 billion chickens being raised here each year as broilers. It is not uncommon today for a single poultry farm to produce hundreds of thousands of broilers per year for market.

Heretofore, several techniques have been known in the art for killing fowl such as chickens prior to cleaning and butchering. Generally, the bird is stunned by concussion or shock and then bled to death. In the past, such poultry had normally been killed by cutting the neck skin of the bird and the jugular vein in the neck in order to allow the heart to continue beating, thereby pumping the blood from the fowl and permitting complete draining of blood therefrom as it bleeds to death. It is desirable to cause death by rapid bleeding in order to avoid putting the animal in shock for any period of time before death, since the physiological and biochemical changes induced by shock will adversely affect the eating qualities of the fowl. It is also undesirable to sever the spinal cord, windpipe, or gullet of the bird at the time the jugular vein is severed.

Severing the spinal cord of the bird is undesirable because it stops the heart beat of the bird. The continuing heart beat observed for a period of time when only the jugular vein is severed is highly desirable because it causes blood to be pumped from the bird's body, which improves the quality of the fowl, rather than to simply drain by gravity.

If the windpipe is severed at the time the jugular vein is cut, the continuing heart beat of the bird will also cause continued bleeding of the bird and drawing of the blood into the lungs.

While numerous bleeding techniques have heretofore been employed, all suffer disadvantages that become magnified when used on a large scale production basis. The desirability of bleeding alone without severing the head of a fowl imposes severe restrictions, often sacrificing the desired rapid bleeding rate in order to obtain a bled carcass with the head intact. The killing of poultry as it moves along the processing line has commonly been accomplished by manually severing the jugular vein without cutting the windpipe or spinal cord. Most modern processing plants, however, have a very high production rate. As a result, the manual operator is so rushed that he often cuts deeply into the neck of the bird. When the neck of the bird is cut too deeply, it is contaminated when the chicken is passed through the scalding bath. It is also difficult for the operator to be consistent in lining up his cuts at the jugular vein, since the vein is covered by feathers at the point of cutting it on the neck. Also, it has been found that the head of the chicken may easily be knocked off during the feather-picking operation which is conducted further down the poultry processing line.

Thus, it is preferable that the killing of poultry as it moves along a processing line be accomplished without severing the spinal cord, gullet or windpipe, and also without even cutting the neck skin of the bird.

SUMMARY OF THE INVENTION

It is a general purpose of this invention to provide a method and apparatus for killing fowl having all of the advantages of similarly employed prior art methods and devices with none of the above described disadvantages. In order to obtain this, the present invention provides a unique method for killing fowl which comprises passing a cutting member through the head of the fowl from ear to ear, whereby both the internal and external jugular veins are severed on each side. In order to utilize this technique with assembly line speed and precision, the present invention also provides apparatus for carrying out the cutting technique.

Accordingly, an object of the present invention is to provide a method for killing fowl by severing the jugular veins in the head, thereby causing a profuse bleeding and rapid death.

It is another object of this invention to provide a method for killing fowl by severing the jugular veins without cutting the neck, spinal cord, windpipe or gullet of the bird.

An additional object of this invention is to provide a method for killing fowl by rapid bleeding with simple rapid and accurate location of a cutting path.

Another object of this invention is to provide a method of killing fowl which is sufficiently rapid and precise to be used in modern assembly line techniques of fowl processing.

A further object of this invention is to provide apparatus for killing fowl by passing a cutting member through the head of the fowl from ear to ear, whereby both jugular veins are severed on each side.

Still another object of this invention is to provide apparatus for killing fowl which assures that the neck, spinal cord, windpipe and gullet will not be severed.

Still another object of this invention is to provide apparatus for killing fowl which is adaptable to assembly line processing.

Yet another object of this invention is to provide and apparatus for killing fowl which is self-cleaning.

A still further object of the present invention is to provide an apparatus for killing fowl which is power-driven and self-cleaning after each cutting operation.

The foregoing and other objects are obtained in accordance with the present invention by a method for killing fowl which comprises passing a cutting member through the head of the fowl from ear to ear, whereby both the internal and external jugular veins are severed on each side. A suitable apparatus for use in assembly line processing of fowl comprises an air powered piston in a cylinder having lateral externally mounted rigid connecting members attached through a stripper plate to an anvil, thereby maintaining a fixed spaced relationship between the anvil and stripper plate which is a distance less than the length of the cutting member. A rigid piston rod slideably extends through a hole in the cylinder head, and a cutting member is detachably secured to the end of the piston rod. Preferably, the cutting member is a hollow cutting member having a hole proximately located in the side thereof and a sharpened distal end which is slideably mounted in the stripper plate. In operation, the head of the fowl to be slaughtered is held between the stripper plate and anvil, and the ears lined up with the cutting member. Actuating the piston forces the cutting member through the head from ear to ear, severing both jugular veins on each side, and thereby causing profuse bleeding and rapid death. When the preferred hollow cutting member of the present invention is utilized, tissue debris which is locked in the cutting member from the prior slaughter is forced out through a hole in the side thereof as the cutting member strikes the anvil, thereby avoiding the need for cleaning after each use.

BRIEF DESCRIPTION OF THE DRAWINGS

These and other objects, features, and advantages of the invention will become more fully apparent to those skilled in the art from the following description of an illustrative embodiment of the invention, as shown in the annexed drawings, wherein like reference characters designate like or corresponding parts throughout the several figures, and in which:

FIG. 1 is a perspective view of a fowl slaughtering device;

FIG. 2 is a top cross-sectional view of the device in FIG. 1;

FIG. 3 is a detailed view of a hollow cutting member modified to impart a twisting motion while cutting.

DESCRIPTION OF AN ILLUSTRATIVE EMBODIMENT

It has been found in accordance with the present invention that fowl such as chickens may be slaughtered by passing a cutting member through the head from ear to ear. By such a technique, both the internal and external jugular veins are severed, causing profuse bleeding and rapid death. Use of the ears as a target greatly improves cutting accuracy, even by unskilled operators. A particularly suitable apparatus for carrying out this technique in poultry processing comprises an air powered piston operating a rod-shaped cutting member and having means for accurately lining up the head of the fowl so that the ears present a suitable target.

Referring now to FIG. 1, the fowl slaughtering device of the present invention includes an anvil 17 and a stripper plate 16 affixed to a cylinder 13 by a rigid connecting member 15. The stripper plate has an orifice 19 therein which is lined up with the piston rod, guiding movement of a cutting member 18. The head of the fowl is placed between the anvil and the stripper plate, and the ears are lined up with the edge of the cutting member. Activation of the piston forces the cutting member 18, which is affixed to a piston rod, through the head of the fowl, severing both the internal and external jugular veins on both the left and right sides. For convenient handling, the fowl slaughtering apparatus is provided with a suitable handle 11, and an activator 12, which functions as a trigger. The particular design of the handle and location and design of the activator button are matters of comfort and convenience. The base of the handle, or the near end of the cylinder, is provided with an air coupling 10 or the like, which may be connected to a suitable source of pressurized air. In one preferred embodiment, the cutting member is a hollow tube, having a sharpened distal end 24 and a hole 25 in the side of the proximate end thereof. While tissue debris from the head of the first fowl to be slaughtered will lodge in the hollow cutting member, subsequent use of the apparatus will force this debris out through the hole 25 in the proximate end thereof as the cutting member collects and discharges debris in continued operation.

As shown in more detail in FIG. 2, the cylinder mechanism may be of conventional construction. Piston 20 is provided with suitable sealing means, such as the O-ring shown at 22, so that it remains air tight. A piston rod 21 is connected to the piston, and the cutting member 18 is detachably mounted at the outer end thereof. The piston rod passes through a suitable hole in a cylinder head 14, which may additionaly be provided with an air vent 23 to facilitate use of a double acting cylinder. Alternatively, a spring return may be provided, in which a spring 27 is seated in the piston chamber to provide for automatic return to the starting position once the piston has been fired. While a rigid connecting member 15 is shown as a rod extending from the anvil to the base of the cylinder, any suitable means may be used which will provide a spaced relationship between the anvil, stripper plate, and cylinder head. Anvil 17 is secured to the rigid connecting member by conventional means, such as set screw 26.

A particularly desirable design for a hollow cutting member is shown in FIG. 3, wherein one or more helical ribs 30 are shown integrally affixed to the cutting member, and a corresponding groove 31 is provided in the stripper plate to receive them. Of course, the construction could be reversed, with the stripper plate having ribs fitting into helical grooves on the cutting member. Such a design imparts a twisting motion to the cutting member as it is propelled, thereby providing a more efficient cutting technique.

It will be apparent that an apparatus of the type described facilitates correct location of cutting, since the head of the fowl is simply placed between the anvil and stripper plate, and the ears placed in line with the cutting member. This may conveniently be done with one hand, while the other hand is free to activate the piston. This provides a simple, rapid, and accurate technique for slaughtering fowl which has long been sought in assembly line processes.

It will be appreciated that other modifications of the device shown in the drawings may readily be made for various purposes. Thus, while it is not necessary for the entire apparatus to be constructed in the attached form shown, this type of construction has been found to be highly suitable for use in poultry processing plants, allowing the operator a maximum degree of freedom. It will be appreciated that while the foregoing disclosure relates only to illustrative embodiments of the invention in killing poultry and other fowl, it is capable of use for various other purposes, and will provide a suitable poultry killing method and apparatus under different conditions. Accordingly, numerous modifications or alterations may be made by those skilled in the art without departing from the spirit and scope of the invention as set forth in the appended claims.

What is claimed is:

1. In a method of killing poultry and other fowl, the step of:
   a. severing a jugular vein by forming an opening in the head of the fowl by removal of a portion of tissue, whereby rapid bleeding of the fowl will occur.

2. In a method of killing poultry and other fowl, the steps of severing the jugular vein adjacent the ear on one side of the head of the fowl, whereby rapid bleeding of the fowl through the severed jugular vein will occur without detaching the head from the body, said severing detail to remove an amount of tissue from the head of the fowl adjacent said cut jugular vein.

3. In a method of killing poultry and other fowl, the steps of severing the jugular vein adjacent the ears at each side of the head of the fowl by making a cut transversely through the head adjacent the ears, whereby the jugular vein adjacent each side will be severed by said cut passing through the head to allow rapid bleeding of the fowl without detaching the head from the body.

4. In a method of killing poultry and other fowl the steps of severing the jugular vein adjacent the ears at each side of the head of the fowl by making a cut transversely through the head of the fowl along an imaginery line between the ears of the head of the fowl to allow rapid bleeding of the fowl without detaching the head from the body.

5. In a method of killing poultry and other fowl as described in claim 3 including a further step of;
   b. removing an amount of tissue from the head of the fowl adjacent the cut passing transversely through the head of the fowl.

* * * * *